US011269340B2

(12) United States Patent
Zhu et al.

(10) Patent No.: US 11,269,340 B2
(45) Date of Patent: Mar. 8, 2022

(54) METHOD FOR DETERMINING A VEHICLE CONTROL PARAMETER, APPARATUS FOR THE SAME, VEHICLE ON-BOARD CONTROLLER, AND AUTONOMOUS VEHICLE

(71) Applicants: Baidu USA LLC, Sunnyvale, CA (US); Baidu.com Times Technology (Beijing) Co., Ltd., Beijing (CN)

(72) Inventors: Fan Zhu, Sunnyvale, CA (US); Lin Ma, Beijing (CN); Qi Kong, Sunnyvale, CA (US)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 380 days.

(21) Appl. No.: 16/265,772

(22) Filed: Feb. 1, 2019

(65) Prior Publication Data
US 2020/0103912 A1 Apr. 2, 2020

(30) Foreign Application Priority Data

Sep. 30, 2018 (CN) .......................... 201811161479.1

(51) Int. Cl.
*G05D 1/02* (2020.01)
*G05D 1/00* (2006.01)
*G06N 20/00* (2019.01)
(52) U.S. Cl.
CPC .......... *G05D 1/0221* (2013.01); *G05D 1/0088* (2013.01); *G06N 20/00* (2019.01)

(58) Field of Classification Search
CPC ..... G05D 1/0221; G05D 1/0088; G06N 20/00
See application file for complete search history.

(56) References Cited

U.S. PATENT DOCUMENTS

| 10,431,089 | B1 * | 10/2019 | Nguyen | B60Q 9/00 |
|---|---|---|---|---|
| 2007/0179735 | A1 * | 8/2007 | Fiedler | G01C 21/16 |
| | | | | 702/150 |
| 2014/0005871 | A1 * | 1/2014 | Saito | B60L 15/2036 |
| | | | | 701/22 |
| 2016/0280236 | A1 * | 9/2016 | Otsuka | B60W 50/082 |
| 2017/0090478 | A1 * | 3/2017 | Blayvas | G07C 5/0808 |
| 2017/0166203 | A1 * | 6/2017 | Sugai | B60L 15/20 |

(Continued)

*Primary Examiner* — Hussein Elchanti
(74) *Attorney, Agent, or Firm* — Seed IP Law Group LLP

(57) ABSTRACT

Embodiments of the present disclosure disclose a method for determining a vehicle control parameter, an apparatus for the same, a vehicle on-board controller, and an autonomous vehicle. An embodiment of the method comprises: obtaining a lateral offset sequence of a vehicle and a control input sequence of a controller for controlling a lateral output of the vehicle, wherein a lateral offset in the lateral offset sequence is for characterizing an offset between an actual lateral output of the vehicle and a desired lateral output; executing a step of determining a vehicle control parameter; wherein the executing the step of determining the vehicle control parameter includes: with the lateral offset sequence as an input and the control input sequence as the desired output, training a pre-established vehicle dynamic model to obtain a trained vehicle dynamic model; and determining the vehicle control parameter from the trained vehicle dynamic model.

11 Claims, 6 Drawing Sheets

(56) References Cited

U.S. PATENT DOCUMENTS

| | | | | |
|---|---|---|---|---|
| 2017/0313304 A1* | 11/2017 | Shiraishi | ............... | B60W 10/20 |
| 2017/0369052 A1* | 12/2017 | Nagy | .................... | B60W 30/14 |
| 2019/0347879 A1* | 11/2019 | Motomura | ........... | G07C 5/0825 |
| 2020/0164888 A1* | 5/2020 | Hiramatsu | ............ | B60W 50/00 |

* cited by examiner

METHOD FOR DETERMINING A VEHICLE CONTROL PARAMETER, APPARATUS FOR THE SAME, VEHICLE ON-BOARD CONTROLLER, AND AUTONOMOUS VEHICLE

TECHNICAL FIELD

Embodiments of the present disclosure relate to the field of automatic driving, more specifically relate to the field of vehicle control, and particularly relate to a method for determining a vehicle control parameter, an apparatus for the same, a vehicle on-board controller, and an autonomous vehicle.

BACKGROUND

In the field of automatic driving, autonomous control of a vehicle is usually done through a vehicle brain when the vehicle is in a self-driving state. Specifically, a control module in the vehicle brain may generate a control instruction based on ambiance parameters collected by the sensor and vehicle control parameters to generate a control signal, thereby meeting a corresponding control indicator, e.g. causing the vehicle to accurately follow a planned route.

Therefore, vehicle control parameters are fundamental for the control module to accurately follow a planned route.

In addition to sensor accuracy and steering wheel response accuracy, configurations of dynamic parameters for lateral control of a vehicle (e.g., a weight of the vehicle body and a position of mass center) also produce a significant impact on control accuracy during driving of the vehicle. During real-time driving process of a vehicle, fixed vehicle dynamic parameters cannot guarantee control accuracy in cases of change of the vehicle weight and change of the position of mass center (e.g., loading and unloading working conditions of an AGV (Automated Guided Vehicle)), which thus cannot meet the demands of mass production.

SUMMARY

Embodiments of the present disclosure provide a method for determining a vehicle control parameter, an apparatus for the same, a vehicle on-board controller, and an autonomous vehicle.

In a first aspect, an embodiment of the present disclosure provides a method for determining a vehicle control parameter, comprises: obtaining a lateral offset sequence of a vehicle and a control input sequence of a controller for controlling a lateral output of the vehicle, wherein a lateral offset in the lateral offset sequence is for characterizing an offset between an actual lateral output of the vehicle and a desired lateral output; executing a step of determining a vehicle control parameter; wherein the executing the step of determining the vehicle control parameter includes: with the lateral offset sequence as an input and the control input sequence as a desired output, training a pre-established vehicle dynamic model to obtain a trained vehicle dynamic model; and determining the vehicle control parameter from the trained vehicle dynamic model.

In some embodiments, obtaining a lateral offset sequence of a vehicle and a control input sequence of a controller for controlling a lateral output of the vehicle comprises: in response to a vehicle body steering angle of the vehicle exceeding a preset steering angle threshold during a continuous time interval, obtaining the lateral offset sequence of the vehicle and the control input sequence of the controller for controlling the lateral output of the vehicle during the continuous time interval.

In some embodiments, the executing the step of determining the vehicle control parameter includes: in response to determining that a current lateral offset of the vehicle exceeds a preset lateral offset threshold, executing the step of determining the vehicle control parameter.

In some embodiments, the vehicle control parameter includes a mass of the vehicle and a mass distribution among four sides of the vehicle; and the determining the vehicle control parameter from the trained vehicle dynamic model comprises:
resolving the mass of the vehicle and the mass distribution among the four sides of the vehicle from a parameter matrix of the trained vehicle dynamic model.

In some embodiments, the method further comprises: performing steering control to the vehicle based on the vehicle control parameter determined from the trained vehicle dynamic model.

In a second aspect, an embodiment of the present disclosure provides an apparatus for determining a vehicle control parameter, comprises: an obtaining unit configured for obtaining a lateral offset sequence of a vehicle and a control input sequence of a controller for controlling a lateral output of the vehicle, wherein a lateral offset in the lateral offset sequence is for characterizing an offset between an actual lateral output of the vehicle and a desired lateral output; a control parameter determining unit configured for executing a step of determining a vehicle control parameter; wherein the executing the step of determining the vehicle control parameter includes: with the lateral offset sequence as an input and the control input sequence as a desired output, training a pre-established vehicle dynamic model to obtain a trained vehicle dynamic model; and determining the vehicle control parameter from the trained vehicle dynamic model.

In some embodiments, the obtaining unit is further configured for: in response to a vehicle body steering angle of the vehicle exceeding a preset steering angle threshold during a continuous time interval, obtaining the lateral offset sequence of the vehicle and the control input sequence of the controller for controlling the lateral output of the vehicle during the continuous time interval.

In some embodiments, the control parameter determining unit is further configured for: in response to determining that a current lateral offset of the vehicle exceeds a preset lateral offset threshold, executing the step of determining the vehicle control parameter.

In some embodiments, the vehicle control parameter includes a mass of the vehicle and a mass distribution among four sides of the vehicle; and the control parameter determining unit is further configured for: resolving the mass of the vehicle and the mass distribution among the four sides of the vehicle from a parameter matrix of the trained vehicle dynamic model.

In some embodiments, the apparatus further comprises: a steering control unit configured for performing steering control to the vehicle based on the vehicle control parameter determined from the trained vehicle dynamic model.

In a third aspect, embodiments of the present disclosure provide a vehicle on-board controller, comprising: one or more processors; storage means for storing one or more programs, wherein when the one or more programs are executed by the one or more processors, the one or more processors are caused to implement the method described according to the first aspect.

In a fourth aspect, embodiments of the present disclosure provide an autonomous vehicle, comprising a vehicle on-board controller described according to the third aspect.

In a fifth aspect, embodiments of the present disclosure provide a computer readable storage medium on which a computer program is stored, wherein the program, when being executed by a processor, implements the method described according to the first aspect.

By means of obtaining a lateral offset sequence of a vehicle and a control input sequence of a controller for controlling a lateral output of the vehicle, training a pre-established vehicle dynamic model based on the lateral offset sequence and the control input sequence, and then determining a vehicle control parameter from the trained vehicle dynamic model, the technical solution of determining a vehicle control parameter provided by the embodiments of the present disclosure implements autonomous update of the vehicle control parameter, and thus reduces an adverse impact on control accuracy due to change of the vehicle control parameter.

BRIEF DESCRIPTION OF THE DRAWINGS

Other features, objectives, and advantages of the present disclosure will become more apparent through reading the detailed description of the non-limiting embodiments with reference to the drawings below.

DETAILED DESCRIPTION OF THE PREFERRED EMBODIMENTS

Figure 1:
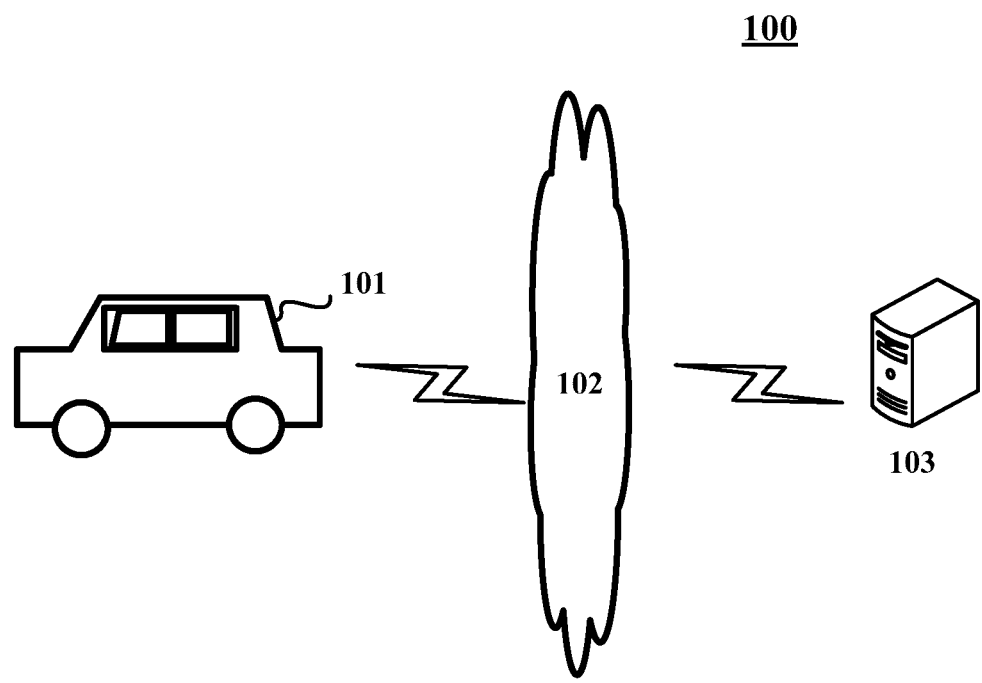
FIG. 1 is an exemplary system architecture diagram in which a method for determining a vehicle control parameter according to an embodiment of the present disclosure may be applied.

Hereinafter, the present disclosure will be described in further detail with reference to the accompanying drawings and the embodiments. It may be understood that the preferred embodiments described herein are only for illustrating the relevant invention, not for limiting the present disclosure. Additionally, it needs to be further noted that for the ease of depiction, only those parts related to the present disclosure are illustrated in the drawings.

Furthermore, it needs to be noted that without conflicts, the embodiments and the features in the embodiments of the present disclosure may be combined with each other. Hereinafter, the present disclosure will be described in detail with reference to the drawings in conjunction with the embodiments.

FIG. 1 illustrates an exemplary system architecture 100 in which embodiments of a method for determining a vehicle control parameter or an apparatus for determining a vehicle control parameter according to the present disclosure.

The system architecture 100 may comprise an autonomous vehicle 101, a network 102, and a server 103. The network 102 is configured as a medium for providing a communication link between the autonomous vehicle 101 and the server 103. The network 102 may comprise various connection types, e.g., a wired/wireless communication link or an optical fiber cable, etc.

The autonomous vehicle 101 may interact with the server 103 via the network 102 to receive or send messages, etc. Sensors like a vehicle radar, processors such as a vehicle brain, and various communication devices may be mounted on the autonomous vehicle 101.

The server 103 may be a server that provides various services, e.g., a server for processing the offset data collected by the autonomous vehicle 101. The server 103 may perform processing such as analyzing the received lateral offset sequence and control input sequence, and returns a processing result (e.g., a vehicle control parameter of the autonomous vehicle) to the autonomous vehicle 101.

It needs to be noted that the method for determining a vehicle control parameter as provided by the embodiments of the present disclosure may be executed by the autonomous vehicle 101 or by the server 103, or partially by the autonomous vehicle 101 and partially executed by the server 103. Correspondingly, the apparatus for determining the vehicle control parameter may be provided in the server 103 or provided in the autonomous vehicle 103; or, part of the modules are provided in the server 103 while the remaining part are provided in the autonomous vehicle 101.

It should be understood that the numbers of autonomous vehicles 101, networks 102, and servers 103 in FIG. 1 are only schematic. Any numbers of autonomous vehicles 101, networks 102 and servers 103 may be provided according to implementation needs.

Figure 2:
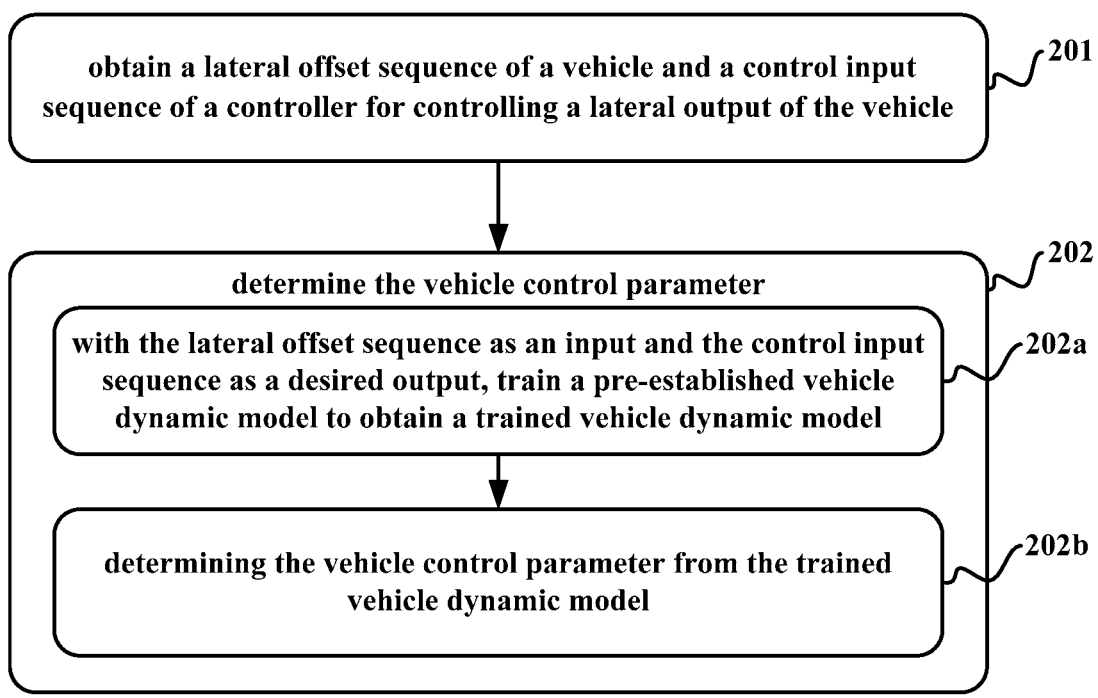
FIG. 2 is a flow chart of an embodiment of a method for determining a vehicle control parameter according to the present disclosure.

Now, continue to refer to FIG. 2, which shows a flow chart 200 of an embodiment of a method for determining a vehicle control parameter according to the present disclosure.

In various embodiments of the present disclosure, the vehicle control parameter may be any vehicle parameter that impacts a control signal outputted by any executing body (e.g., the autonomous vehicle 101 or server 103 as shown in FIG. 1) for controlling a vehicle to move and/or stop.

Besides, the vehicle mentioned in various embodiments of the present disclosure may refer to an unmanned vehicle or a manned vehicle in a self-driving state.

It may be understood that the method for determining a vehicle control parameter of this embodiment may be executed at any feasible time.

For example, in some application scenarios, determination of the vehicle parameter may be executed once at preset intervals. Then, in such application scenarios, if a time difference between the current time point and the time point of last determination of the vehicle parameter reaches a preset time interval, execution of the method of determining a vehicle control parameter according to the present embodiment may start.

Or, in some other application scenarios, it may be set to determine the vehicle parameter once after the vehicle drives through a bumpy road segment. Then, in such application scenarios, if an ambiance collected by a sensor (e.g., a camera) of the vehicle indicates that the vehicle drives through a bumpy road segment, execution of the method of determining a vehicle control parameter according to the present embodiment may start.

Here, "determination of the vehicle control parameter" may be understood as, for example, determining a current numerical value of the vehicle control parameter, or determining a change amount of the current value of the vehicle control parameter relative to the historical value.

The method for determining a vehicle control parameter, comprising:

Step 201: obtaining a lateral offset sequence of a vehicle and a control input sequence of a controller for controlling a lateral output of the vehicle, wherein a lateral offset in the lateral offset sequence is for characterizing an offset between an actual lateral output of the vehicle and a desired lateral output.

Here, the lateral offset sequence of the vehicle may include a plurality of lateral offsets ranked in time sequence. Similarly, the control input sequence of the vehicle may include control inputs ranked in time sequence when they are obtained.

Besides, the actual lateral output and the desired lateral output for determining the lateral offset may be any feasible outputs that may characterize the features of lateral movement of the vehicle.

Figure 3:
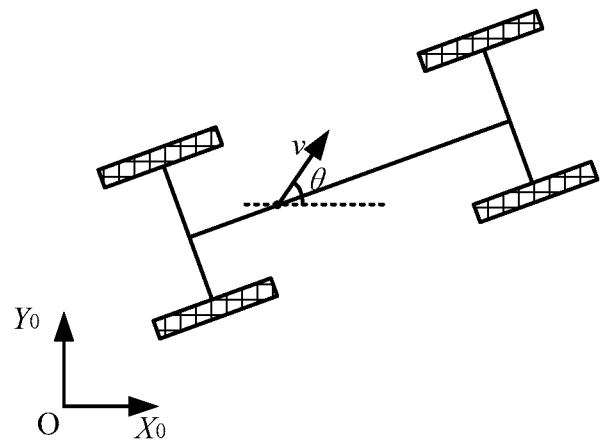
FIG. 3 is a schematic diagram of a vehicle azimuth.

In some application scenarios, the lateral output of the vehicle for example may be an azimuth of the vehicle. As shown in FIG. 3, the azimuth is an included angle $\theta$ between the velocity v of the mass center of the vehicle and the transverse axis $OX_0$ in the ground coordinate system $X_0Y_0O$. In such application scenarios, respective lateral offsets in the lateral offset sequence of the vehicle may be offsets between the actual azimuths and the desired azimuths of the vehicle at respective sampling time points.

Figure 4:
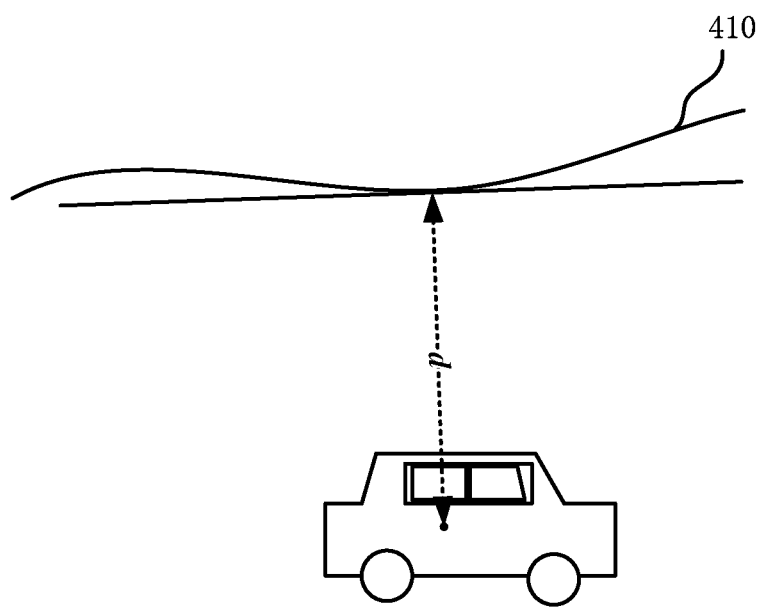
FIG. 4 is a schematic diagram of a lateral offset of a vehicle.

Or, in some other application scenarios, the lateral offsets in the lateral offset sequence of the vehicle may be lateral offset amounts of the vehicle. In such optional implementation manners, as shown in FIG. 4, the lateral offset amount of a vehicle may be understood as a distance between an actual position of the mass center of the vehicle and a vehicle planned trajectory 410, for example, the segment of distance illustrated by the signal d.

Or, in some other application scenarios, a lateral offset in the lateral offset sequence of the vehicle may not only include a component of the offset between the actual azimuth and the desired azimuth of the vehicle, but also may include the component of the lateral offset amount of the vehicle.

In this step, in the lateral offset sequence of the vehicle, the sampling time points of respective lateral offsets are exactly in one-to-one correspondence with the sampling time points of respective control inputs in the control input sequence of the controller for controlling lateral outputs of the vehicle. For example, in the lateral offset sequence $X=\{x_{ti}|i=1, 2, \ldots, n\}$ of the vehicle, the sampling time point of each element $x_{ti}$ is ti. Correspondingly, in the control input sequence $\Lambda=\{\delta_{t'i}|i=1, 2, \ldots, n\}$ of the controller for controlling the lateral outputs of the vehicle, the sampling time point of each element $\delta_{t'i}$ is $t'_i$.

In some application scenarios, in the lateral offset sequence X of the vehicle, the sampling time point $t_i$ of each element $x_{ti}$ may be equal to the sampling time point $t'_i$ of each element $\delta_{t'i}$ in the control input sequence $\Lambda$, namely, $t_i=t'_i$ (i=1, 2, \ldots, n). In other words, in these application scenarios, at each sampling time point, the lateral offset of the vehicle and the control input of the controller for controlling the lateral outputs of the vehicle may be collected concurrently at each sampling time point.

Or, in some other application scenarios, due to existence of vehicle inertia and the response speed limitation of the controller, the actual output produced by the control input at the time point t is always embodied after delaying by a certain time interval (e.g., delayed by $\Delta t_{delay}$). Therefore, to embody an association between the control input and the lateral output it can produce as accurately as possible, in the lateral offset sequence A of the vehicle, the following correspondence relationship may exist between the sampling time point $t_i$ of each element $a_{ti}$, and the sampling time point $t'_1$ of each element $b_{t'i}$ in the control input sequence B:

$$t_i = t'_i + \Delta t_{delay} \tag{1}$$

It may be understood that the specific value of delay $\Delta t_{delay}$ may be determined based on the weight of the vehicle and the response speed of the controller for controlling the lateral output of the vehicle.

Step 202: executing a step of determining the vehicle control parameter.

Here, the executing the step of determining the vehicle control parameter may further comprise:

Step 202*a*: with the lateral offset sequence as an input and the control input sequence as a desired output, training a pre-established vehicle dynamic model to obtain a trained vehicle dynamic model.

Here, the vehicle dynamic model may refer to a model that can characterize a dynamic process of the vehicle in movement. For example, the vehicle dynamic model may characterize a function relationship among the vehicle control parameter, the vehicle lateral offset, a derivative of the vehicle lateral offset, and the vehicle control input.

For example, in some application scenarios, in the lateral offset sequence $X=\{x_{ti}|=1,2, \ldots, n\}$, each $x_{ti}=[e_{cg}, \theta_c]^T$. Then, the vehicle dynamic model may have the following expression:

$$\begin{bmatrix} \dot{e}_{cg} \\ \dot{\theta}_c \end{bmatrix} = [a_{ij}]_{2 \times 2} \begin{bmatrix} e_{cg} \\ \theta_c \end{bmatrix} + [b_{ij}]_{2 \times 1} \delta \tag{2}$$

where $e_{cg}$ denotes a lateral offset of the vehicle at a certain sampling time point $t_i$ (the meaning of lateral offset for example may refer to FIG. 4), and $\theta_c$ denotes an offset of the azimuth of the vehicle at the sampling time point $t_i$ (the meaning of the azimuth for example may refer to FIG. 3 and the literal description corresponding to FIG. 3). Correspondingly, $\dot{e}_{cg}$ denotes the derivative of the lateral offset of the vehicle at the sampling time point $t_i$. Further, $\dot{\theta}_c$ denotes the derivative of the azimuth of the vehicle at the sampling time point $t_i$. Correspondingly, $\delta$ denotes a control input of the controller for controlling the lateral output of the vehicle at a certain sampling time point $t'_i$ corresponding to the sampling time point $t_i$.

Besides, respective elements $a_{ij}$, $b_{ij}$ in $[a_{ij}]_{2 \times 2}$ and $[b_{ij}]_{2 \times 1}$ may be coefficients associated with the vehicle control parameter. In other words, given the vehicle control parameter, $a_{ij}$ and $b_{ij}$ are both unique and definite.

Here, the training process of the pre-established vehicle dynamic model may be understood as a process of resolving the numerical values of respective elements in the matrices $[a_{ij}]_{2 \times 2}$ and $[b_{ij}]_{2 \times 1}$ based on the lateral offset sequence of the vehicle as determined through pre-collection and the control input sequence corresponding thereto.

Step 202b: determining the vehicle control parameter from the trained vehicle dynamic model.

As described in step 202a, respective elements $a_{ij}$, $b_{ij}$ in $[a_{ij}]_{2\times 2}$ and $[b_{ij}]_{2\times 1}$ may be coefficients associated with the vehicle control parameter. Moreover, given the vehicle control parameter, $a_{ij}$ and $b_{ij}$ are both unique and definite. In this way, if the numerical values of respective elements in the matrices $[a_{ij}]_{2\times 2}$ and $[b_{ij}]_{2\times 1}$ are determined in step 202a, Then, in the present step 202b, the specific numerical values of the vehicle control parameters may be resolved based on the relationships between the vehicle control parameter and respective elements $a_{ij}$, $b_{ij}$ in the matrices $[a_{ij}]_{2\times 2}$ and $[b_{ij}]_{2\times 1}$.

By means of obtaining a lateral offset sequence of a vehicle and a control input sequence of a controller for controlling a lateral output of the vehicle, training a pre-established vehicle dynamic model based on the lateral offset sequence and the control input sequence, and then determining a vehicle control parameter from the trained vehicle dynamic model, the method for determining a vehicle control parameter provided by the embodiments of the present disclosure implements autonomous update of the vehicle control parameter, and thus reduces an adverse impact on control accuracy due to change of the vehicle control parameter.

Figure 5:
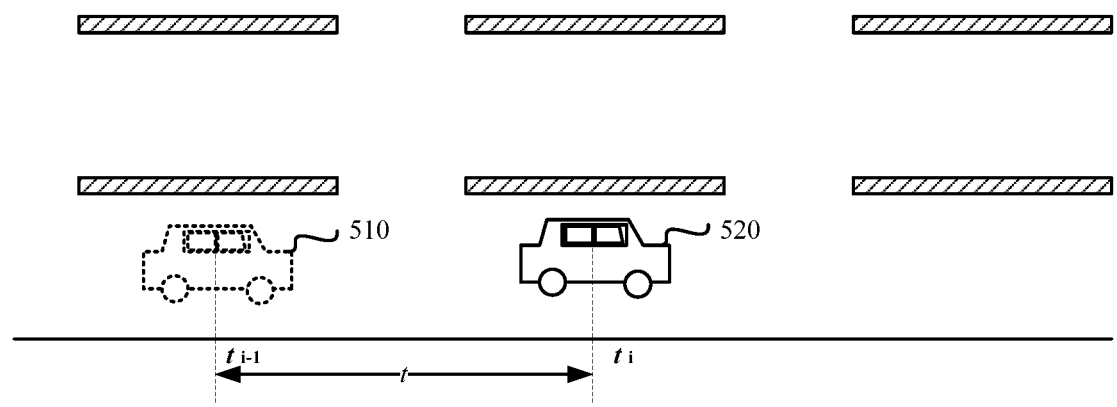
FIG. 5 is a schematic diagram of an application scenario for a method for determining a vehicle control parameter according to the present disclosure.

Continue to refer to FIG. 5, which shows a schematic diagram 500 of an application scenario for a method for determining a vehicle control parameter according to the present disclosure.

In the application scenario shown in FIG. 5, an interval for control parameter determination to the vehicle may be preset to every t seconds.

Supposing at the time point $t_{i-1}$, the vehicle is shown by the reference numeral 510, and at the current time point $t_i$, the vehicle is shown by the reference numeral 520.

If the interval between the time point $t_i$ and the time point $t_{i-1}$ is t seconds and at the time point $t_{i-1}$, a step of parameter determination is executed with respect to the vehicle control parameter, due to t seconds existing between the current time point $t_i$ and the time point $t_{i-1}$ of last determination of the vehicle, the current time point satisfies a preset update condition, and then execution of the calibration step starts.

Specifically, a lateral offset sequence of a vehicle and a control input sequence of a controller for controlling a lateral output of the vehicle may be first obtained. For example, a lateral offset sequence of a vehicle and a control input sequence of a controller for controlling a lateral output of the vehicle during the time interval from the time point $t_{i-1}$ to the time point $t_i$ may be first obtained.

Next, with the lateral offset sequence as an input and the control input sequence as the desired output, a pre-established vehicle dynamic model is trained to obtain a trained vehicle dynamic model.

Next, the vehicle control parameter is determined from the trained vehicle dynamic model.

In this way, by means of training the pre-established vehicle dynamic model based on the relationship between the lateral offset sequence of the vehicle and the control input sequence of the controller for controlling a lateral output of the vehicle during the time interval from the time point $t_{i-1}$ to the time point $t_i$, respective coefficients and/or coefficient matrices in the vehicle dynamic model may be determined; and then, the current vehicle parameter may be resolved based on the relationship between the respective coefficients and/or coefficient matrices and the vehicle control parameter.

In some optional implementation manners of the method for determining a vehicle control parameter of this embodiment, the step 201 of obtaining a lateral offset sequence of a vehicle and a control input sequence of a controller for controlling a lateral output of the vehicle may further comprise:

in response to a steering angle of the steering wheel of the vehicle exceeding a preset steering angle threshold during a continuous time interval, obtaining the lateral offset sequence of the vehicle and the control input sequence of the controller for controlling the lateral output of the vehicle during the continuous time interval.

Generally, when the steering angle of the vehicle body of the vehicle is relatively large, the accuracy of the vehicle control parameter usually has a greater impact on the lateral offset of the vehicle. Therefore, in these optional implementation manners, by collecting and/or determining the lateral offset sequence of the vehicle and the control input sequence of the controller for controlling the lateral output of the vehicle during the time interval where the steering angle of the vehicle body exceeds the preset steering angle threshold, the impact of the vehicle control parameter on the vehicle lateral offset may be embodied more significantly.

In some application scenarios of such optional implementation manners, for example, the lateral offset sequence of the vehicle and the control input sequence of the controller for controlling the lateral outputs of the vehicle during a turning process may be selected; and/or, the lateral offset sequence of the vehicle and the control input sequence of the controller for controlling the lateral output of the vehicle during a U-turn process may be selected.

In some optional implementation manners of the method for determining a vehicle control parameter according to the present embodiment, the step 202 of executing a step of determining the vehicle control parameter may further comprise:

in response to determining that a current lateral offset of the vehicle exceeds a preset lateral offset threshold, executing the step of determining the vehicle control parameter.

In these optional implementation manners, the current lateral offset for example may refer to a lateral offset at the sampling time point closest to the current time point in the lateral offset sequence of the vehicle obtained in step 201.

It may be understood that in some application scenarios of these optional implementation manners, if the current lateral offset is a scalar quantity (e.g., the current azimuth offset), the preset lateral offset threshold is also a scalar quantity in these application scenarios. If the current lateral offset is greater than or equal to the preset lateral offset threshold, the step of determining the vehicle control parameter (e.g., the step 202a and the step 202b as described above) may be executed.

Or, in some other application scenarios of these optional implementation manners, if the current lateral offset is a vector (e.g., the current lateral offset includes a current azimuth offset component and a current lateral offset amount), then in these application scenarios, the preset lateral offset threshold is also a vector. If the at least one component in the current lateral offset is greater than or equal to a component corresponding thereto in the preset lateral offset threshold, the step of determining the vehicle control parameter (e.g., the step 202a and the step 202b as described above) may be executed.

Figure 6:
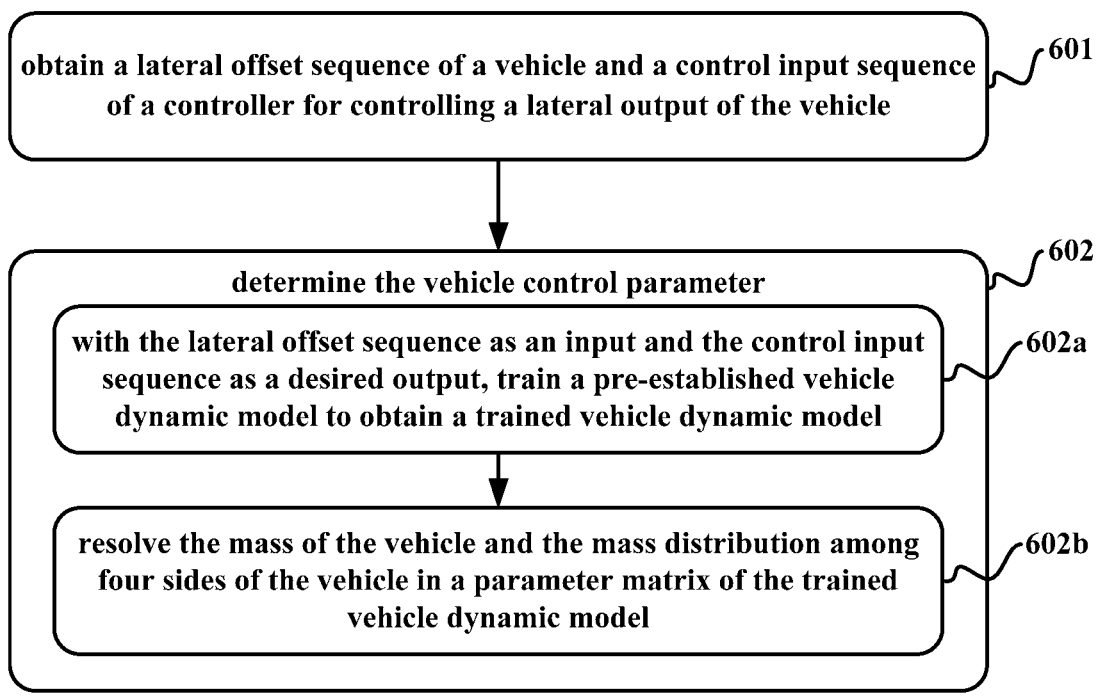
FIG. 6 is a flow chart of another embodiment of a method for determining a vehicle control parameter according to the present disclosure.

Now, continue to refer to FIG. 6, which shows a flow chart 600 of another embodiment of a method for determining a vehicle control parameter according to the present disclosure. In this embodiment, the vehicle control parameter includes a mass of the vehicle and a mass distribution among four sides of the vehicle. Here, the mass distribution among the four sides of the vehicle for example may be the pressures of the left front wheel, the left rear wheel, the right front wheel, and the right rear wheel of the vehicle against the ground surface in a static state.

The flow 600 of the method for determining a vehicle control parameter includes:

Step 601: obtaining a lateral offset sequence of a vehicle and a control input sequence of a controller for controlling a lateral output of the vehicle, wherein a lateral offset in the lateral offset sequence is for characterizing an offset between an actual lateral output of the vehicle and a desired lateral output.

This step may be implemented in a manner similar to step 201 of the embodiment shown in FIG. 2, which will not be detailed here.

In some optional implementation manners of this embodiment, each lateral offset xti in the lateral offset sequence $X=\{x_{ti}|i=1,2,\ldots,n\}$ for example may include the lateral offset $e_{cg}$ of the vehicle, the derivative $\dot{e}_{cg}$ of the lateral offset $e_{cg}$, the offset $\theta_c$ of the azimuth, and the derivative $\dot{\theta}_c$ of the offset $\theta_c$ of the azimuth at the time point $t_i$, namely, $x_{ti}=[e_{cg}, \dot{e}_{cg}, \theta_c, \dot{\theta}_c]_{ti}^T$.

Step 602: executing a step of determining the vehicle control parameter.

Here, the executing the step of determining the vehicle control parameter may further comprise:

Step 602a: with the lateral offset sequence as an input and the control input sequence as a desired output, training a pre-established vehicle dynamic model to obtain a trained vehicle dynamic model.

In this embodiment, the vehicle dynamic model may have the following expression:

$$\begin{bmatrix} \dot{e}_{cg} \\ \ddot{e}_{cg} \\ \dot{\theta}_c \\ \ddot{\theta}_c \end{bmatrix} = [a_{ij}]_{4\times 4} \begin{bmatrix} e_{cg} \\ \dot{e}_{cg} \\ \theta_c \\ \dot{\theta}_c \end{bmatrix} + [b_{ij}]_{4\times 1} \delta \quad (3)$$

Let $$x = \begin{bmatrix} e_{cg} \\ \dot{e}_{cg} \\ \theta_c \\ \dot{\theta}_c \end{bmatrix},$$

the dynamic model of the expression (3) may be modified as:

$$\dot{x}=Ax+B\delta \quad (4)$$

The elements in matrix A and matrix B are associated with the mass m of the vehicle and the pressures $l_f$ and $l_r$ of the left front wheel and the left rear wheel against the ground surface in the four-side mass distribution. Besides, other parameters in the matrix A are all known.

Supposing that the controller for controlling the lateral outputs of the vehicle is LQR (Linear Quadratic Regulator), the relationship between the input of the LQR and the feedback gain (i.e., lateral offset x) is specified below:

$$\delta=-Kx \quad (5)$$

where $K=(R+B^TP^B)^{-1}B^TP^A$, and the matrix P is a solution of the Ricatti equation (6) below:

$$P=A^TPA-A^TPB(R+BTPB)^{-1}B^TPA+Q \quad (6)$$

where Q and R are known.

In this way, by adjusting the numerical values of respective components in matrix A and matrix B based on the offset between the actual control input and the control input calculated from the lateral offset in according to equation (5), the numerical values of respective components in matrix A and matrix B may be finally determined.

Step 602b: resolving the mass of the vehicle and the mass distribution among four sides of the vehicle in a parameter matrix of the trained vehicle dynamic model.

It may be seen from the equation (3) that after determining the numerical values of respective components in matrix A and matrix B, the mass m of the vehicle and the pressures $l_f$ and $l_r$ of the left front wheel and the left rear wheel against the ground surface in the four-side mass distribution may be resolved. Afterwards, the pressures $r_f$ and $r_r$ of the right front wheel and the right rear wheel of the vehicle against the ground surface may be further determined based on the mass m of the vehicle and the pressures $l_f$ and $l_r$ of the left front wheel and the left rear wheel of the vehicle against the ground surface. In this way, a vehicle control parameter that may produce a relatively large impact on the accuracy of the steering control of the vehicle may be determined, i.e., the mass m of the vehicle and the pressures $l_f$ and $l_r$ of the left front wheel and the left rear wheel of the vehicle against the ground surface, and the pressures $r_f$ and $r_r$ of the right front wheel and the right rear wheel of the vehicle.

It may be understood that in some optional implementation manners of the method for determining a vehicle control parameter in various embodiments of the present disclosure, after determining the vehicle control parameter, the steering control of the vehicle may be performed based on the vehicle control parameter determined from the trained vehicle dynamic model, such that the generated control instruction matches the actual vehicle control parameter, thereby achieving a more accurate control effect, e.g., more accurately following the planned trajectory.

Figure 7:
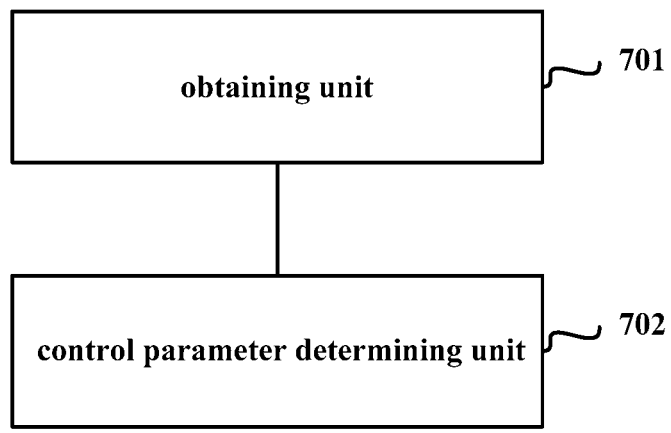
FIG. 7 is a structural diagram of an embodiment of an apparatus for determining a vehicle control parameter according to the present disclosure.

Further refer to FIG. 7. To implement the methods shown in respective drawings above, the present disclosure provides an embodiment of an apparatus for determining a vehicle control parameter. The apparatus embodiment corresponds to the method embodiment shown in FIG. 2. The apparatus may be specifically applied to various electronic devices.

As shown in FIG. 7, the apparatus for determining a vehicle control parameter in the present embodiment comprises an obtaining unit 701 and a control parameter determining unit 702, wherein:

the obtaining unit 701 may be configured for obtaining a lateral offset sequence of a vehicle and a control input sequence of a controller for controlling a lateral output of the vehicle, wherein a lateral offset in the lateral offset sequence is for characterizing an offset between an actual lateral output of the vehicle and a desired lateral output;

the control parameter determining unit 702 may be configured for executing a step of determining a vehicle control parameter; wherein the executing the step of determining the vehicle control parameter includes: with the lateral offset sequence as an input and the control input sequence as a desired output, training a pre-established vehicle dynamic model to obtain a trained vehicle dynamic model; and determining the vehicle control parameter from the trained vehicle dynamic model.

In some optional implementation manners, the obtaining unit 701 is further configured for: in response to a vehicle body steering angle of the vehicle exceeding a preset steering angle threshold during a continuous time interval, obtaining the lateral offset sequence of the vehicle and the control input sequence of the controller for controlling the lateral output of the vehicle during the continuous time interval.

In some optional implementation manners, the control parameter determining unit 702 may be further configured for: in response to determining that a current lateral offset of the vehicle exceeds a preset lateral offset threshold, executing the step of determining the vehicle control parameter.

In some optional implementation manners, the vehicle control parameter includes a mass of the vehicle and a mass distribution among four sides of the vehicle.

In some embodiments, the control parameter determining unit 702 may be further configured for: resolving the mass of the vehicle and the mass distribution among the four sides of the vehicle in a parameter matrix of the trained vehicle dynamic model.

In some optional implementation manners, the apparatus for determining a vehicle control parameter in this embodiment may further comprise a steering control unit (not shown).

In such optional implementation manners, the steering control unit may be configured for performing steering control to the vehicle based on the vehicle control parameter determined from the trained vehicle dynamic model.

Figure 8:
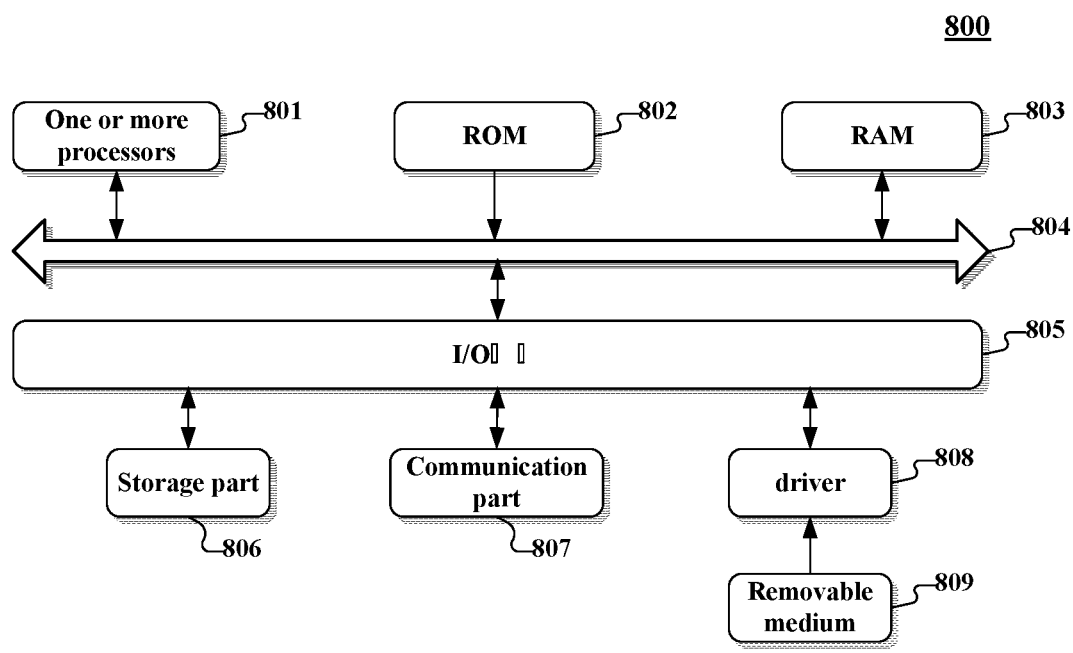
FIG. 8 is a structural schematic diagram of a computer system of an electronic device adapted for implementing a method for determining a vehicle control parameter according to the embodiments of the present disclosure.

Now refer to FIG. 8, which shows a structural schematic diagram of a computer system 800 of an electronic device (e.g., an on-board controller) adapted for implementing a method for calibrating a vehicle control parameter according to the embodiments of the present disclosure. The electronic device shown in FIG. 8 is only an example, which should not constitute any limitation to the function and use scope of the embodiments of the present disclosure.

As shown in FIG. 8, the computer system 800 comprises one or more processors 801 which may perform various kinds of appropriate actions and processing according to computer program instructions stored in a read-only memory (ROM) 802 or a program loaded into the random-access memory (RAM) 803 from a memory part 806. In RAM 803, there may also store various kinds of programs and data needed for operations of the system 800. CPU 801, ROM 802, and RAM 803 are connected with each other via a bus 804 The input/output (I/O) interface 805 may also be connected to the bus 804.

The following components are connected to the I/O interface 805, including: a memory part 806 including a hard disk, etc.; and a communication part 807 including a network interface card such as a LAN (Local Area Network) card, a modem, etc. The communication part 807 performs communication processing via a network such as the Internet. The driver 808 is also connected to the I/O interface 805 as needed. A removable medium 809, such as a magnetic disk, an optical disk, a magneto-optical disk, and a semiconductor memory, etc., is mounted on the driver 808 as needed, so as to facilitate the computer program read therefrom to be installed in the memory part 806.

Particularly, according to the embodiments of the present disclosure, the processes described above with reference to the flow charts may be implemented as computer software programs. For example, an embodiment of the present disclosure includes a computer program product that has a computer program embodied on a computer-readable medium, the computer program containing computer codes for executing the method shown in the flow chart. In such an embodiment, the computer programs may be downloaded and installed from a network through the communication part 807, and/or installed from a removable medium 809. When being executed by the central processing unit (CPU) 801, the computer programs execute the functions limited in the method of the present disclosure. It needs to be noted that the computer readable medium as described in the present disclosure may be a computer-readable signal medium or a computer-readable storage medium or any combination thereof. The computer-readable storage medium, for example, may be, but not limited to, an electrical, magnetic, optical, electromagnetic, infrared, or semiconductor system, apparatus or device, or any combination thereof. More specific examples of the computer-readable storage medium may include, but not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof. In the present disclosure, the computer-readable storage medium may be any tangible medium containing or storing a program that may be used by an instruction executing system, apparatus, or device or used in combination therewith. Further, in the present disclosure, the computer-readable signal medium may include a data signal propagated in a baseband or as part of a carrier, in which computer-readable program codes are carried. A data signal propagated in such a way may assume a plurality of forms, including, but not limited to, an electromagnetic signal, an optical signal, or any appropriate combination thereof. The computer-readable signal medium may also be any computer-readable medium other than the computer-readable storage medium, which computer-readable medium may send, propagate or transmit the programs used by the instruction executing system, apparatus or device. The program codes embodied on the computer-readable medium may be transmitted using any appropriate medium, including, but not limited to: wireless, wired, cable, RF, etc., or any appropriate combination thereof.

Computer readable program instructions for carrying out operations of the present invention may be compiled in one or more programming languages, the programming languages including object-oriented programming languages such as Java, Smalltalk, C++ or the like, as well as conventional procedural programming languages, such as the "C" programming language or similar programming languages. The computer codes may be executed entirely on the user's computer, partially on the user's computer, executed as a stand-alone software package, and partially on the user's computer and partially executed on a remote computer, or entirely executed on the remote computer or server. In a scenario involving a remote computer, the remote computer may be connected to the user's computer through any type of network, including a local area network (LAN) or a wide area network (WAN), or the connection may be made to an external computer (for example, through the Internet using an Internet Service Provider).

The flow charts and block diagrams in the drawings illustrate system architectures, functions, and operations possibly implemented by the system, method, and computer program product of various embodiments of the present disclosure. At this point, each block in the flow charts or block diagrams may represent a module, a program segment, or part of codes, wherein the module, program segment, or part of codes contain one or more executable instructions for implementing a prescribed logic function. It should also be noted that in some alternative implementations, the functions annotated in the blocks may also occur in a sequence different from what is indicated in the drawings. For example, two successively expressed blocks may be actually executed substantially in parallel, and they may be sometimes executed in a reverse order, dependent on the functions involved. It should also be noted that each block in the block diagrams and/or flow charts and a combination of blocks in the block diagrams and/or flow diagrams may be implemented by a specific hardware-based system for executing a prescribed function or operation, or may be implemented by a combination of specific hardware and computer instructions.

The units mentioned in the embodiments of the present disclosure may be implemented by software or by hardware. The units as described may also be provided in a processor. For example, they may be described as: a processor comprising an obtaining unit and a parameter determining unit. Particularly, names of these units do not constitute a limitation to the units per se in some circumstances. For example, the obtaining unit may also be described as "a unit for obtaining a lateral offset sequence of a vehicle and a control input sequence of a controller for controlling a lateral output of the vehicle."

As another aspect, the present disclosure provides an autonomous vehicle, comprising an on-board controller described above. It may be understood that the autonomous vehicle may also include a sensing device such as IMU and a power device such as an engine, etc. These devices may all be implemented using the prior art, which will not be detailed here.

As another aspect, the present disclosure further provides a computer-readable medium; the computer-readable medium may be included in the apparatus described in the embodiments; or may be separately provided, without being installed in the apparatus. The computer-readable medium carries one or more programs that, when being executed by the apparatus, cause the apparatus to: obtain a lateral offset sequence of a vehicle and a control input sequence of a controller for controlling a lateral output of the vehicle, wherein a lateral offset in the lateral offset sequence is for characterizing an offset between an actual lateral output of the vehicle and a desired lateral output; execute a step of determining the vehicle control parameter; wherein the executing the step of determining the vehicle control parameter includes: with the lateral offset sequence as an input and the control input sequence as the desired output, train a pre-established vehicle dynamic model to obtain a trained vehicle dynamic model; and determine the vehicle control parameter from the trained vehicle dynamic model.

What have been described above are only preferred embodiments of the present disclosure and an illustration of the technical principle as exploited. Those skilled in the art should understand, the scope of invention in the present disclosure is not limited to the technical solution resulting from a specific combination of the technical features, and meanwhile, should also cover other technical solutions resulting from any combination of the technical features or their equivalent features without departing from the inventive concept. For example, a technical solution resulting from mutual substitution of the features and those technical features disclosed (not limited to) in the present disclosure with similar functions.

What is claimed is:

1. A method for determining a vehicle control parameter, comprising:
    obtaining a lateral offset sequence of a vehicle and a control input sequence of a controller for controlling a lateral output of the vehicle, wherein a lateral offset in the lateral offset sequence comprises a component of an offset between an actual lateral output of azimuth of the vehicle and a desired lateral output of azimuth of the vehicle;
    executing a step of determining the vehicle control parameter; wherein
    the executing the step of determining the vehicle control parameter includes:
    with the lateral offset sequence as an input and the control input sequence as the desired output, training a pre-established vehicle dynamic model to obtain a trained vehicle dynamic model; and
    determining the vehicle control parameter from the trained vehicle dynamic model.

2. The method according to claim 1, wherein the obtaining a lateral offset sequence of a vehicle and a control input sequence of a controller for controlling a lateral output of the vehicle comprises:
    in response to a vehicle body steering angle of the vehicle exceeding a preset steering angle threshold during a continuous time interval, obtaining the lateral offset sequence of the vehicle and the control input sequence of the controller for controlling the lateral output of the vehicle during the continuous time interval.

3. The method according to claim 2, wherein the step of executing determination of a vehicle control parameter includes:
    in response to determining that a current lateral offset of the vehicle exceeds a preset lateral offset threshold, executing the step of determining the vehicle control parameter.

4. The method according to claim 1, wherein the vehicle control parameter includes a mass of the vehicle and a mass distribution among four sides of the vehicle; and
    the determining the vehicle control parameter from the trained vehicle dynamic model comprises:
    resolving the mass of the vehicle and the mass distribution among the four sides of the vehicle in a parameter matrix of the trained vehicle dynamic model.

5. The method according claim 1, further comprising:
    performing steering control to the vehicle based on the vehicle control parameter determined from the trained vehicle dynamic model.

6. An apparatus for determining a vehicle control parameter, comprising:
    at least one processor; and
    a memory storing instructions executable by the at least one processor to perform operations comprising:
        obtaining a lateral offset sequence of a vehicle and a control input sequence of a controller for controlling a lateral output of the vehicle, wherein a lateral offset in the lateral offset sequence comprises a component of an offset between an actual lateral output of azimuth of the vehicle and a desired lateral output of azimuth of the vehicle; and
        determining the vehicle control parameter comprising:
            training a pre-established vehicle dynamic model to obtain a trained vehicle dynamic model with the obtained lateral offset sequence as an input to the model and the obtained control input sequence as a desired output from the model; and
determining the vehicle control parameter from the trained vehicle dynamic model.

7. The apparatus according to claim 6, wherein the obtaining further comprises:
in response to a vehicle body steering angle of the vehicle exceeding a preset steering angle threshold during a continuous time interval, obtaining the lateral offset sequence of the vehicle and the control input sequence of the controller for controlling the lateral output of the vehicle during the continuous time interval.

8. The apparatus according to claim 7, wherein the determining further comprises:
in response to determining that a current lateral offset of the vehicle exceeds a preset lateral offset threshold, determining the vehicle control parameter.

9. The apparatus according to claim 6, wherein the vehicle control parameter includes a mass of the vehicle and a mass distribution among four sides of the vehicle; and
the determining further comprises:
resolving the mass of the vehicle and the mass distribution among the four sides of the vehicle in a parameter matrix of the trained vehicle dynamic model.

10. The apparatus according to claim 6, the operation further comprising:
performing steering control to the vehicle based on the vehicle control parameter determined from the trained vehicle dynamic model.

11. An autonomous vehicle, comprising an apparatus for determining a vehicle control parameter, comprising:
at least one processor; and
a memory storing instructions executable by the at least one processor to perform operations comprising:
obtaining a lateral offset sequence of a vehicle and a control input sequence of a controller for controlling a lateral output of the vehicle, wherein a lateral offset in the lateral offset sequence comprises a component of an offset between an actual lateral output of azimuth of the vehicle and a desired lateral output of azimuth of the vehicle; and
determining the vehicle control parameter comprising:
training a pre-established vehicle dynamic model to obtain a trained vehicle dynamic model with the obtained lateral offset sequence as an input to the model and the obtained control input sequence as a desired output from the model; and
determining the vehicle control parameter from the trained vehicle dynamic model.

* * * * *